United States Patent

[11] 3,548,713

[72] Inventor Ronald Bruce Webster
Melrose, Conn.

[21] Appl. No. 674,225
[22] Filed Oct. 10, 1967
[45] Patented Dec. 22, 1970
[73] Assignee The Gerber Scientific Instrument Company
South Windsor, Conn.
a corporation of Connecticut

[54] PHOTO-EXPOSURE DEVICE USING ANNULAR LIGHT BEAM
1 Claim, 5 Drawing Figs.

[52] U.S. Cl. ....................95/1, 95/12, 355/67, 355/40
[51] Int. Cl. .................... G03
[50] Field of Search .................... 95/1, 12, (Inquired); 355/40

[56] References Cited

UNITED STATES PATENTS

| | | | |
|---|---|---|---|
| 2,830,491 | 4/1958 | Domesher | 95/12 |
| 3,330,182 | 7/1967 | Gerber et al. | 95/1 |
| 3,323,414 | 6/1967 | Ritchie et al. | 95/1 |

*Primary Examiner*—John M. Horan
*Assistant Examiner*—D. J. Clement
*Attorney*—Mc Cormick, Paulding & Huber

ABSTRACT: A device for projecting a beam of light onto a photosensitive surface for the purpose of exposing or generating a line as the beam is moved relative to the surface. The beam, at least at its point of contact with the surface, is annular in shape and accordingly produces an annular spot of light. The annular shape of the beam is produced by an annular aperture in the optical system, and where a number of different width lines are to be exposed a number of different apertures are provided wherein the thickness of the annular band is changed as the major diameter of the aperture changes to achieve a proper exposure for each line width.

PATENTED DEC 22 1970 3,548,713

INVENTOR.
RONALD B. WEBSTER
BY
Mc Cormick, Paulding & Huber
ATTORNEYS

PHOTO-EXPOSURE DEVICE USING ANNULAR LIGHT BEAM

BACKGROUND OF THE INVENTION

This invention relates to devices wherein a photosensitive surface, such as that of a sheet or strip of photographic film, is exposed by a light beam moved over the surface so as to generate a line. Such a line may represent information or data to be recorded or may be part of a pattern or design to be drawn. For example, such devices are now often mounted on the carriages of X–Y plotters and used to expose photographic sheets used in turn to produce masks or similar items used in the production of printed circuit boards and integrated circuit elements, the movement of the devices being controlled by computers or other associated controls for the plotters. A device of the type to which this invention generally pertains is shown and described in the pending patent application of Gerber and Webster, Ser. No. 492,090, filed Oct. 1, 1965, and entitled "Device For Exposing Discrete Portions of a Photosensitive Surface To a Variable Intensity Light Beam." Reference may be had to this application for further details.

In the past when exposing a photosensitive surface by a moving light beam, the spot of light projected onto the surface has generally been circular in shape with the intensity of the light beam generally uniform over the illuminated area. This, however, has the disadvantage of producing a nonuniform distribution of light energy over the width of the generated line with the side edges of the line receiving a minimal amount of light energy and with the center of the line, as measured across its width, receiving a very much larger amount. As a result it has been difficult to produce sharply defined lines because of the impossibility of having an optimum exposure of both the edges and the center of the line. The extra light energy in the center of the line diffuses and tends to spread beyond the edges of the line, sometimes spreading over the entire plate and fogging the film. Also, the ends of the line receive only a small amount of light energy in comparison to that received by most other parts of the line and therefore tend to be fuzzy and indistinct. In cases where the line is drawn in only one direction, or in two orthogonal directions, the problem of indistinct edges can be overcome by using a light beam with a rectangular or square shape, the former being translated perpendicular to its longest dimension. Rectangular apertures are, however, useful only in one axis of motion. A rectangular aperture minimizes the indistinct end problem since the fadeout of light when a line ends occurs over a distance equal to no more than the narrow dimension of the rectangular beam at the line end, the length of the fadeout area being proportional to the dimension of the aperture in the direction of motion.

The object of this invention is therefore to provide a photoexposure device capable of exposing a line on a photosensitive surface by a moving light beam and which line, after development, is of a high quality with sharply defined side and end edges.

SUMMARY OF INVENTION

The invention resides in a photoexposure device for projecting a beam of light onto a photosensitive surface, the beam at its point of contact with the photosensitive surface having an annular shape or at least being of such character that the zone adjacent the outer edge of the area enclosed by the beam is much more intensely illuminated than the center of such area.

DESCRIPTION OF THE PREFERRED EMBODIMENT

Figure 1:
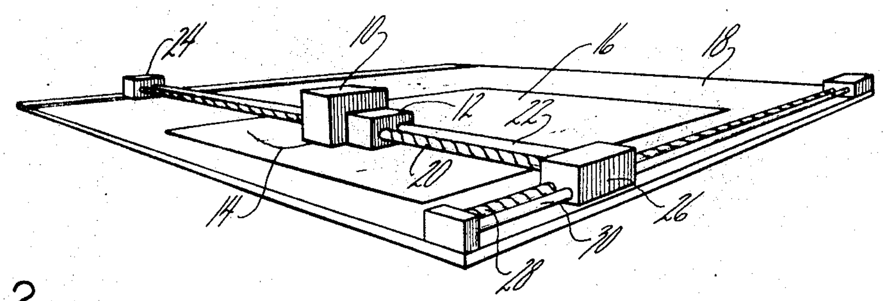
FIG. 1 is a perspective view showing an X–Y plotter utilizing a photoexposure device embodying the present invention.

Turning now to the drawings, FIG. 1 shows, by way of example, a photoexposure device 10, embodying the present invention, mounted on the carriage 12 of an X–Y plotter for exposing lines, such as the line 14, on an associated sheet 16 of photosensitive material. The sheet 16 may be a photographic film and is supported in a flat condition on the bed 18 of the plotter. The plotter may take any one of many conventional forms and in the illustrated case includes, in addition to the carriage 12 and bed 18, a first lead screw 20 acting in conjunction with a guide bar 22. Rotation of the lead screw 20 drives the carriage 12 axially thereof, and the guide bar 22 guides the carriage in this motion. The lead screw 20 and guide bar 22 are supported at one end by a supporting frame or housing 24 movable along the associated edge of the bed 18. At their other ends they are supported by another frame or housing 26. The housing 26 is in turn driven in the direction perpendicular to the movement of the carriage 12 along the lead screw 20 by another lead screw 28. Located parallel to the lead screw 28 is a spline shaft 30 which through gears in the housing 26 drives the lead screw 20. Suitable motors (not shown) drive the lead screw 28 and spline shaft 30 to move the carriage 12 in both directions relative to the bed 18. Therefore, it will be obvious that by properly driving the lead screws 20 and 22 the carriage 12 may be moved to any position in any direction relative to the photosensitive sheet 16.

Figures 2, 3, 4, 5:
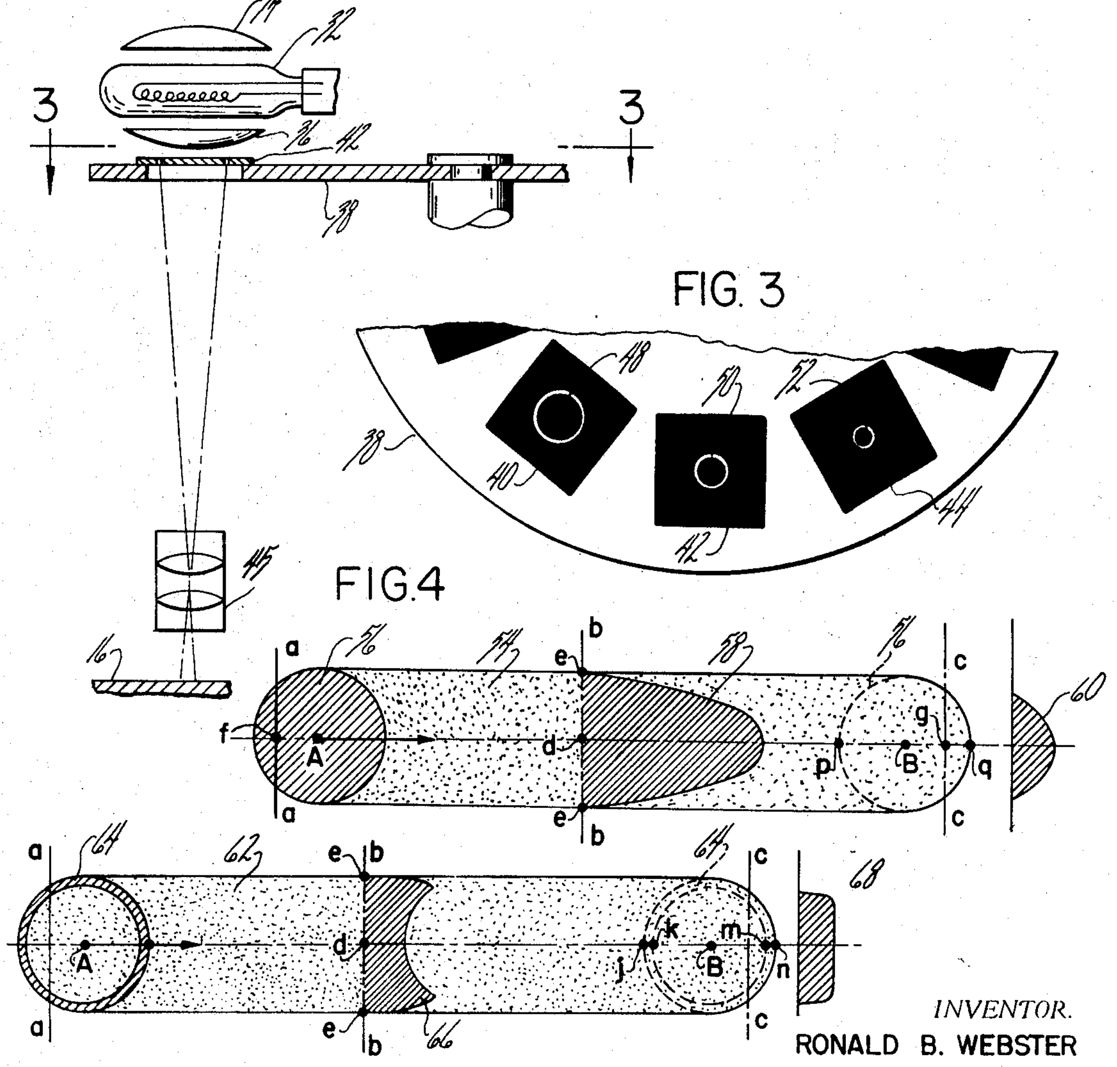
FIG. 2 is a schematic illustration showing an optical system which may be employed in the photoexposure device of FIG. 1.
FIG. 3 is a fragmentary view taken on the line 3–3 of FIG. 2.
FIG. 4 is an illustration showing the drawing of a line by a circular light beam in accordance with the prior art.
FIG. 5 is an illustration showing the drawing of a line with an annular light beam in accordance with this invention.

The photoexposure device 10 of FIG. 1 operates to project a light beam onto the photosensitive sheet 16 and, as a result of the movement of the carriage 12, to draw or expose a line such as the line 14. As mentioned above, the device 10 may be generally similar to that shown in copending application Ser. No. 492,090, and various different optical systems may be used for forming the beam which is projected from the device onto the surface of the sheet 16. FIG. 2, illustrates an exemplary optical system. Referring to this FIG. the system there shown comprises a light source in the form of an incandescent lamp 32. On one side of the lamp 32 is a concave mirror 34 and on the other side is a condenser lens 36. The mirror 34 tends to reflect light rays from the lamp toward the condenser lens 36, and the lens itself tends to form the light rays received thereby into a beam of light which in the area immediately in front of the lens is of a relatively uniform intensity throughout its cross section.

An aperture wheel 38 is located below the condenser lens 36 and carries a plurality of aperture elements such as shown in 40, 42 and 44 in FIG. 3. The aperture wheel 38 is attached to a vertical shaft 46 and the shaft 46 and wheel 38 may be rotatably indexed to bring a selected one of the aperture elements into the area of the uniform illumination provided by the condenser lens 36, the aperture 42 in FIG. 2 being shown in this position. Located below the aperture wheel 38 is a projecting lens or lens system 45 which projects an image of the selected aperture element 42 onto the upper surface of the sheet 16. More particularly, the focal length of the projecting lens 45 and its displacement from the aperture element 42 and sheet 16 are such that a real image of the aperture element is formed on the surface of the sheet 16 by the lens system.

The aperture elements may take various different forms but preferably are transparencies which are opaque at all areas except for that of the actual aperture through which light is to pass. In accordance with the invention the beam projected onto the sheet 16, at its point of contact with the sheet, is of such a character that it encloses a given discrete area of the surface and adjacent the outer edge of such area has a substantially greater illumination or intensity than in a zone adjacent the center of such area. This may be accomplished by using aperture elements wherein each actual aperture is completely transparent adjacent its outer edge and gradually darkens in going toward its center. Preferably, however, each of the aperture elements includes an annular aperture such as shown in FIG. 3, consisting of an annular band completely transparent throughout its full extent or at least of a uniform optical density throughout its full extent. In FIG. 3 the actual aperture of the element 40 is shown at 48, the actual aperture of the element 42 is shown at 50 and the actual aperture of the element 44 is shown at 52. It will therefore be understood that when any one of the aperture elements 40, 42 and 44 is positioned beneath the condenser lens 36 an annular spot of light, representing a real image of its actual aperture, is projected onto the surface 16.

The use of an annular spot of light, or at least one having an outer band more intensely illuminated than its center, has been found to produce remarkably superior results with regard to the quality of drawn lines as compared to lines drawn with circular spots of light having generally uniform illumination. The reasons for these superior results may perhaps better be understood by reference to FIGS. 4 and 5. In FIG. 4 the reference numeral 54 indicates a line drawn by a circular spot of light, such as shown at 56, in being moved from the point A to the point B, as indicated by the arrow. Consider the light energy received by various portions of the line 54. Taking the line *b–b* extending transversely of the line 54, it will be obvious that a point *d* in the center of this line will receive very much more light energy than points *e–e* on opposite sides of the line. This is due to the fact that as the spot 56 passes the line *b–b* the point *d* is illuminated during all of the time required for the full diameter of the spot to pass the point *d* whereas the points *e*, *e* are illuminated only during the instant the center of the spot passes the line of *b–b*. The amount of light energy received by various points on the line *b–b* is shown generally by the line 58 which has a generally elliptical shape. From this it can be appreciated that it is difficult to properly expose the line 54. If the intensity of the spot 56 is chosen so as to correctly illuminate the transverse center of the line 54 then the side edges of the line will very likely be underexposed. On the other hand, if the intensity of the spot 56 is chosen so as to correctly expose the side edges of the line then the center of the line will most likely be seriously overexposed and cause diffusion and scattering within the photosensitive material so as to darken areas located beyond the side edges. The result in either case is usually a vague and somewhat indistinct side edge.

Still referring to FIG. 4, the curve 60 represents the distribution of light energy over points located along either the line *a–a* or the line *c–c* located close to one or the other ends of the line 54. In considering the motion of the spot 56 either from the line *a–a* or toward the line *c–c* it will be understood that all of the points on these lines receive substantially less light energy than they would if the lines *a–a* and *c–c* were traversed completely by the spot. In FIG. 4 the location of the lines *a–a* and *c–c* have so been chosen that each is located from the extreme end point of the line by a distance equal to approximately one-half the radius of the spot 56. It will therefore be evident, as shown by the curve 60, that at a point *f* located at the center of the line *a–a*, or at a point *g* located at the center of the line *c–c*, the amount of light energy received is approximately one-fourth that received at the point *d* on the line *b–b*. The points located on either side of the point *f* or either side of the point *g* on the lines *a–a* and *c–c* are even more drastically affected and as the lines *a–a* and *c–c* are moved even closer to the extreme end points of the line 54 the effect is worsened. The net effect of this is that points of the line 54 located near its ends receive a severely reduced amount of light energy in comparison to that received by other portions of the line and accordingly these points are often underexposed and produce a fuzzy edge at the end of the line.

FIG. 5 is similar to FIG. 4 but shows a line 62 formed by an annular spot of light 64 moved from the point A to the point B in the direction of the arrow. The curve 66 shows the distribution of light energy with regard to points located on a transverse line *b–b* and from this it can be seen that the distribution is such that all of the points on the line *b–b* receive substantially the same amount of light energy or at least an amount within the same order of magnitude. Therefore, if the intensity of the spot 64 is chosen so that the point *d* on the center of the line *b–b* is adequately exposed as the spot 64 is moved thereover, then the points *e–e* on the edge of the line will also be adequately exposed and sharp side edges for the line 62 will be produced. Similarly, considering the distribution of light energy at the ends of the line 62, the curve 68 shows the distribution of light energy along the line *a–a* located near the beginning of the line 62 and the line *c–c* located near the end of the line 62, the lines *a–a* and *c–c* being located from the extreme ends of the line 62 by a distance equal to about one-half the radius of the spot 64. From the curve 68 it will be seen that all the points along the lines *a–a* and *c–c* receive approximately one-half the amount of light energy as the points located along the line *b–b*. Although this energy is only half of that received by the points along the line *b–b*, this is usually still a sufficient amount of energy to produce an acceptable exposure of the sheet 16, and as a result the line 62 is so exposed at its ends as to produce a relatively sharp end edge. It should also be noted that in FIG. 5 if the amount of light energy received along the center of the line between the points *h* and *j* is to be considered a 100 percent value, the amount of light energy received along the center of the line between the points *k* and *m*, as the end of the line is reached, remains constant at a 50 percent value of light energy. From the point *m* to the point *n* the value of light energy received by the center of the line decreases in a linear fashion, but this decrease occurs over the relatively small thickness of the annular aperture. In comparison to this it will be noted that in FIG. 4, as the end of the line is reached, the amount of light energy received along the center of the line falls off linearly from the point *p* to the point *q* or over the whole diameter of the circular spot.

As discussed in the aforementioned application Ser. No. 492,090, different widths of lines may be drawn by the photoexposure device 10 by varying the size of the aperture whose image is projected onto the photosensitive surface. In using circular apertures, it is desirable to vary the intensity of the projected light spot to control the exposure and overcome the fact that a point traversed by a large diameter beam is illuminated for a longer amount of time then a point traversed by a smaller diameter beam traveling at the same speed. This change in intensity may be effected either by using filters with the apertures or by varying the intensity of the light source in accordance with the size of aperture used. An advantage of using an annular spot of light in place of a circular spot is that the need for varying the intensity of the projected beam by means of filters or otherwise is eliminated. Instead, the same effect is obtained by designing the aperture elements such that as the major diameter of the actual aperture decreases the thickness of its annular band is charged to a valve which gives proper edge exposure. The width of annular band required for each thickness of line is probably best determined by empirical or trial-and-error methods; however, once one width of aperture band is established as satisfactory for one width of line the same width of aperture band will as a general rule be satisfactory for other widths of line. This is shown, for example, in connection with the apertures 48, 50 and 52 of FIG. 3. The aperture 48 has a relatively large major diameter and is used for drawing a relatively wide line. The aperture 52, on the other hand, has a relatively small major diameter and is used for drawing a relatively thin line, but its annular band is of approximately the same thickness as the annular band of the aperture 48. The aperture 50 has an intermediate major diameter and is used for drawing a line of intermediate width, but again has an annular band of approximately the same thickness as the annular bands of the apertures 48 and 52. If any one of the apertures 48, 50, 52 is used to produce a beam moved at a given speed relative to sheet 16, and with the same amount of illumination from the light source of 32, it will be obvious that each line drawn by the different apertures will receive substantially the same amount of light along their centerlines. It should be understood, however, that it may not always be desirable that the width of the annular aperture band remain constant for different diameter apertures and in some instances better results may perhaps be obtained by either increasing or decreasing the width of the aperture band with changes in the major diameter of the aperture.

It should also be noted that circular annular apertures such as shown at 48, 50 and 52 in FIG. 3, and as discussed in connection with FIG. 5, are usually preferred in cases where the beam may be moved in any direction relative to the photosensitive surface. The beam need not, however, in all instances be perfectly circular in shape and if desired may sometimes take the shape of various different closed geometric figures. For example, where the beam is moved only along one axis or two orthogonal axes the beam may be of a rectangular, square or diamond shape. Therefore, it is not intended that the invention, at least in its broader aspects, be limited merely to circular annular apertures such as shown in the drawing, and the claims which follow should be so interpreted.

I claim:

1. A photoexposure device for projecting a beam of light onto a photosensitive surface for the purpose of exposing a line as said beam is moved relative to said surface, said device comprising a source of light, means providing a plurality of generally annular apertures each consisting of an annular transparent band surrounded by opaque areas, means for directing rays of light from said source to a selected one of said apertures to illuminate the same, and a projecting lens system for projecting an image of the selected aperture onto said surface, said annular transparent bands comprising said apertures having different major diameters and having substantially uniform thicknesses as measured between their major and minor diameters.